No. 648,655. Patented May 1, 1900.
E. W. CUSHING.
APPARATUS FOR REMOVING DEPOSIT OF CARBON FROM INCANDESCENT ELECTRIC LIGHT BULBS.
(Application filed Nov. 29, 1899.)
(No Model.)
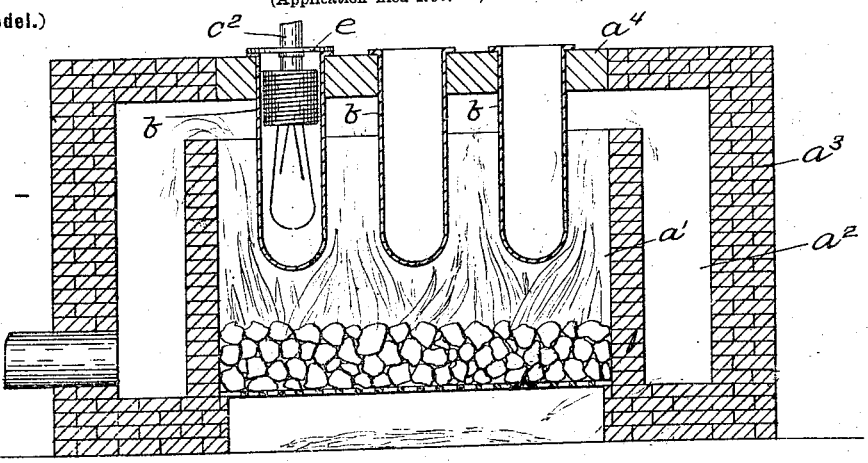
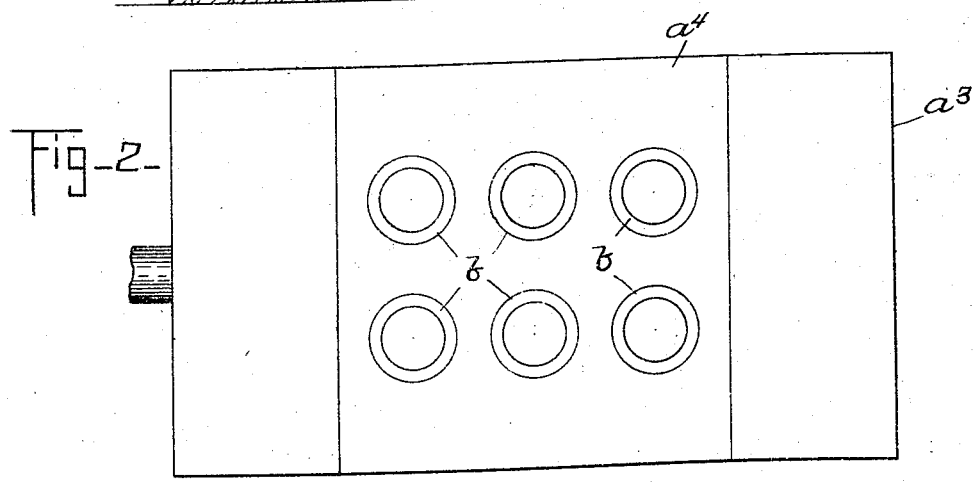
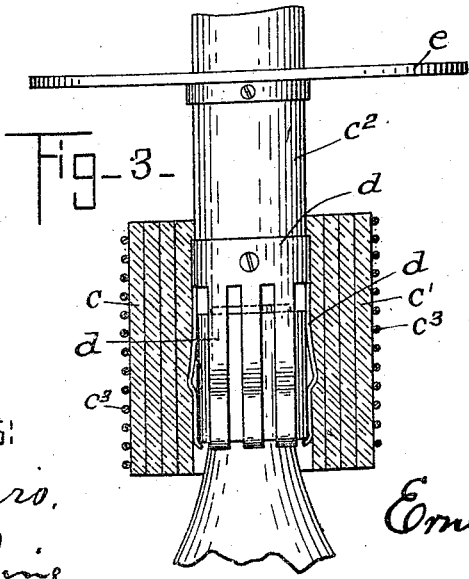
Witnesses:
H. B. Davis.
Arthur V. Cushing
Inventor:
Ernest W. Cushing

UNITED STATES PATENT OFFICE.

ERNEST W. CUSHING, OF MIDDLETON, MASSACHUSETTS.

APPARATUS FOR REMOVING DEPOSIT OF CARBON FROM INCANDESCENT-ELECTRIC-LIGHT BULBS.

SPECIFICATION forming part of Letters Patent No. 648,655, dated May 1, 1900.

Application filed November 29, 1899. Serial No. 738,626. (No model.)

*To all whom it may concern:*

Be it known that I, ERNEST W. CUSHING, a citizen of the United States, residing at Middleton, in the county of Essex, State of Massachusetts, have invented an Improvement in Apparatus for Removing Deposit of Carbon from Incandescent-Electric-Light Bulbs, of which the following description, in connection with the accompanying drawings, is a specification, like letters on the drawings representing like parts.

This invention relates to an apparatus for removing the coating or layer of carbon from the inside of the bulb of an incandescent electric lamp which is deposited thereon by disintegration of the carbon filament incident to passing an electric current through it.

So far as I am aware it is now common to subject the usual glass bulb to the direct action of a flame for a sufficient length of time to heat the bulb to the required degree to volatilize or oxidize the carbon and to cause the vapor to escape through a small aperture provided at the apex of the bulb. This method, however, is very unsatisfactory, because the directly-applied heat causes a large percentage of breakage of bulbs and in many instances seriously injures the cement by means of which the usual collars or bases are secured to the bulbs.

My improved apparatus consists, essentially, in means for volatilizing or oxidizing or otherwise removing the coating or layer of carbon which is deposited upon the interior of the bulb by subjecting the bulb to the action of radiant heat as contrasted to subjecting it to the direct action of a flame.

One way of carrying out this invention and which in practice proves very effective is to provide a suitable furnace with a top of fire-clay or magnesio-calcite or other material which is a non-conductor of heat and to support in said top a number of open-mouthed pots or crucibles, which will be made of any suitable heat-conducting material, as iron, said pots or crucibles being disposed in direct contact with the flame, and to provide suitable lamp-holders, which are constructed and arranged to receive the lamps and hold them in said pots or crucibles in such manner that they will not touch the pot or crucible, and the lamps thus supported are consequently subjected only to the radiating heat of said pot or crucible. The lamp-holders are also preferably constructed so as to serve as closing-caps for the open-mouthed pots or crucibles, which materially assists in retaining the heat in said pots or crucibles, and they are also preferably constructed so as to keep the heat away from the collars or bases of the lamps as much as possible, and thus protect the cement which secures the collars or bases to the bulbs.

Figure 1 shows in longitudinal vertical section an apparatus embodying this invention for removing the deposit of carbon from the interior of the bulbs of incandescent electric lamps; Fig. 2, a plan view of the furnaces shown in Fig. 1; and Fig. 3, a view of the lamp-holder, partly in section and partly in elevation.

$a$ represents a furnace which may be of any suitable construction adapted for the purposes herein designed, it being herein shown as comprising a fire-pot $a'$ and a surrounding chamber $a^2$, having its side walls $a^3$ and top wall $a^4$ composed of fire-brick or any other suitable material which is a non-conductor of heat, and the walls of the surrounding chamber $a^2$ are so arranged with relation to the fire-pot that the heat will be distributed equally.

$b$ represents one of a number of pots or crucibles which are adapted to be supported in the furnace in such manner as to be heated to the required temperature. These pots or crucibles are formed with open mouths, and they are made of iron or other heat-conducting material and are fitted into holes formed or provided in the top wall $a^4$ of the furnace, yet they are capable of being removed from said top wall whenever desired in order that others may be substituted as may be required.

$c$ represents one of the lamp-holders, (see Figs. 1 and 3,) and, as herein shown, it consists, essentially, of a tubular end portion $c'$, attached to one end of a rod or bar $c^2$, said tubular end portion $c'$ being composed of magnesio-calcite, asbestos, or any equivalent material which is practically incombustible and a non-conductor of heat, said rod or bar $c^2$ being composed of a material which is a non-conductor of heat, and said rod or bar $c^2$ is made of suitable length to serve as and constitute a handpiece by which the lamp-holder may be conveniently manipulated. The tubular end portion $c'$ may be composed of a number of layers of material bound together and held by wire, as shown at $c^3$, or it may be otherwise constructed. The tubular end portion $c'$ when attached to the end of the handpiece $c^2$ presents a socket into which the base of the lamp is placed, and to hold the lamp when thus placed in the socket a suitable engaging device is provided which is contained in said socket and which is attached to the end of the rod or bar $c^2$, although it may be attached to the tubular end portion $c'$. As herein shown, the said engaging device consists of a collar $d$, formed with a number of spring-acting fingers of suitable length and shape to engage the base of the lamp and hold it securely. In lieu of this form of engaging device it is obvious that any other suitable form or construction of engaging device may be provided. When the lamp is introduced into the socket and is engaged by said engaging device, it will be seen that the collar or base of the lamp is quite fully protected from the heat, which is important.

The lamp is easily and quickly introduced into and connected with the lamp-holder, and the lamp-holder, with the lamp engaged and held by it, is then introduced into the open mouth or end of one of the pots or crucibles $b$, as represented in Fig. 1.

To support the lamp-holder in elevated position in the pot or crucible, I have secured to the handpiece $c^2$ a circular or other-shaped plate $e$, which is adapted to rest on top of the pot or crucible, and said plate is preferably made of suitable shape and size to practically close the open mouth or end of the pot or crucible so as to confine the heat in said pot or crucible.

The tubular end portion $c'$ of the lamp-holder is made of suitable size to freely enter the pot or crucible $b$, yet it will be seen that it also substantially closes the open end of the pot or crucible, and acting in conjunction with the plate $e$ will very effectually confine and retain the heat in the pot or crucible.

The lamp-holder is made of suitable length relative to the length of the pot or crucible to hold the lamp in said pot or crucible free from contact with the walls thereof, yet when the lamp is thus contained in said pot or crucible it will be subjected to the heat radiating from said pot or crucible, and the coating or layer of carbon which is deposited upon the interior of the bulb will be caused to escape through the perforation provided in the end of the bulb.

In practice the temperature will be maintained sufficient to heat the pots or crucibles red-hot, and in practice I find that at such a temperature the glass bulbs will be heated sufficiently to drive off the interior coating or deposit of carbon, yet will not melt.

The heat causes the carbon to escape from the perforated bulb, and the presumption is that it is volatilized or oxidized, and consequently while I have herein referred to volatilizing or oxidizing the carbon I intend to and do include any other condition by which the carbon is removed by the action of the heat.

I claim—

1. In an apparatus for removing the deposit of carbon from the interior of the bulb of an incandescent electric lamp, a pot or crucible, means for heating it, and a lamp-holder adapted to support the lamp in said pot or crucible free from contact therewith, substantially as described.

2. In an apparatus for removing the deposit of carbon from the interior of the bulb of an incandescent electric lamp, a pot or crucible, means for heating it, and a lamp-holder adapted to support the lamp in said pot or crucible free from contact therewith, having a handpiece of non-conducting material by which said lamp-holder may be removed, substantially as described.

3. In an apparatus for removing the deposit of carbon from the interior of the bulb of an incandescent electric lamp, a pot or crucible, means for heating it, a lamp-holder provided with an engaging device for engaging the base of the lamp, said lamp-holder supporting the lamp in said pot or crucible free from contact therewith, substantially as described.

4. In an apparatus for removing the deposit of carbon from the interior of the bulb of an incandescent electric lamp, a pot or crucible, means for heating it, and a lamp-holder adapted to support the lamp in said pot or crucible free from contact therewith, and to also substantially close the open end of said pot or crucible, substantially as described.

5. In an apparatus for removing the deposit of carbon from the interior of the bulb of an incandescent electric lamp, a pot or crucible, means for heating it, and a lamp-holder having an engaging device for engaging the base of the lamp and having means for protecting said base from the heat and also having a support by which the lamp is held in the pot or crucible free from contact therewith, substantially as described.

6. In an apparatus for removing the deposit of carbon from the interior of the bulb of an incandescent electric lamp, a pot or crucible, means for heating it and a lamp-holder having an engaging device for engaging the base of the lamp and having means for protecting said base from the heat and also having means for supporting the said lamp-holder with the lamp free from contact with the pot or crucible, and also having means for closing the open end of the pot or crucible, substantially as described.

In testimony whereof I have signed my name to this specification in the presence of two subscribing witnesses.

ERNEST W. CUSHING.

Witnesses:
ARTHUR P. CUSHING,
B. J. NOYES.